(12) United States Patent
Di et al.

(10) Patent No.: US 10,097,925 B2
(45) Date of Patent: Oct. 9, 2018

(54) DIAPHRAGM DOME, METHOD FOR MANUFACTURING THE SAME AND SPEAKER

(71) Applicants: Xun Di, Shenzhen (CN); Lipeng Ma, Shenzhen (CN); Ping Liang, Shenzhen (CN); Bin Zhao, Shenzhen (CN); Xudong Yan, Shenzhen (CN)

(72) Inventors: Xun Di, Shenzhen (CN); Lipeng Ma, Shenzhen (CN); Ping Liang, Shenzhen (CN); Bin Zhao, Shenzhen (CN); Xudong Yan, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/417,208

(22) Filed: Jan. 26, 2017

(65) Prior Publication Data
US 2018/0124518 A1    May 3, 2018

(30) Foreign Application Priority Data

Oct. 27, 2016 (CN) .......................... 2016 1 0969425

(51) Int. Cl.
| | |
|---|---|
| *H04R 7/12* | (2006.01) |
| *B32B 3/28* | (2006.01) |
| *B32B 5/12* | (2006.01) |
| *B32B 37/06* | (2006.01) |
| *B32B 37/10* | (2006.01) |

(Continued)

(52) U.S. Cl.
CPC ............. *H04R 7/125* (2013.01); *B29C 70/00* (2013.01); *B32B 3/28* (2013.01); *B32B 5/12* (2013.01); *B32B 37/06* (2013.01); *B32B 37/10* (2013.01); *B32B 38/185* (2013.01); *H04R 7/127* (2013.01); *H04R 31/003* (2013.01); *B32B 2250/20* (2013.01); *B32B 2250/42* (2013.01); *B32B 2260/023* (2013.01); *B32B 2260/046* (2013.01); *B32B 2262/106* (2013.01); *B32B 2305/076* (2013.01); *B32B 2307/10* (2013.01); *B32B 2307/54* (2013.01); *B32B 2313/04* (2013.01); *B32B 2363/00* (2013.01); *B32B 2457/00* (2013.01); *H04R 2307/023* (2013.01); *H04R 2307/029* (2013.01)

(58) Field of Classification Search
CPC ..................................................... H04R 7/127
USPC ......................................................... 428/113
See application file for complete search history.

(56) References Cited

U.S. PATENT DOCUMENTS

2006/0266577 A1* 11/2006 Inoue ....................... H04R 7/10
                                                          181/167

* cited by examiner

*Primary Examiner* — Brent T O'Hern
(74) *Attorney, Agent, or Firm* — Na Xu; IPro, PLLC

(57) ABSTRACT

The present disclosure disclose a diaphragm dome, the diaphragm dome includes a first carbon fiber layer and a second carbon fiber layer which are alternatively arranged by stacking, the first carbon fiber layer and the second carbon fiber layer are respectively a single-layer structure formed by an one-way extended carbon fiber bundle, an extending direction of the carbon fiber bundle of the first carbon fiber layer is perpendicular to an extending direction of the carbon fiber bundle of the second carbon fiber layer, and a thickness difference exists between the first carbon fiber layer and the second carbon fiber layer. In the diaphragm dome provided by the present disclosure, the material has larger specific strength, thus can reduce the thickness of the diaphragm dome, the carbon fiber layers of the diaphragm dome are well adhered, which is not readily layered, and has good water resistance.

10 Claims, 1 Drawing Sheet

(51) Int. Cl.
    *B32B 38/18*    (2006.01)
    *H04R 31/00*    (2006.01)
    *B29C 70/00*    (2006.01)

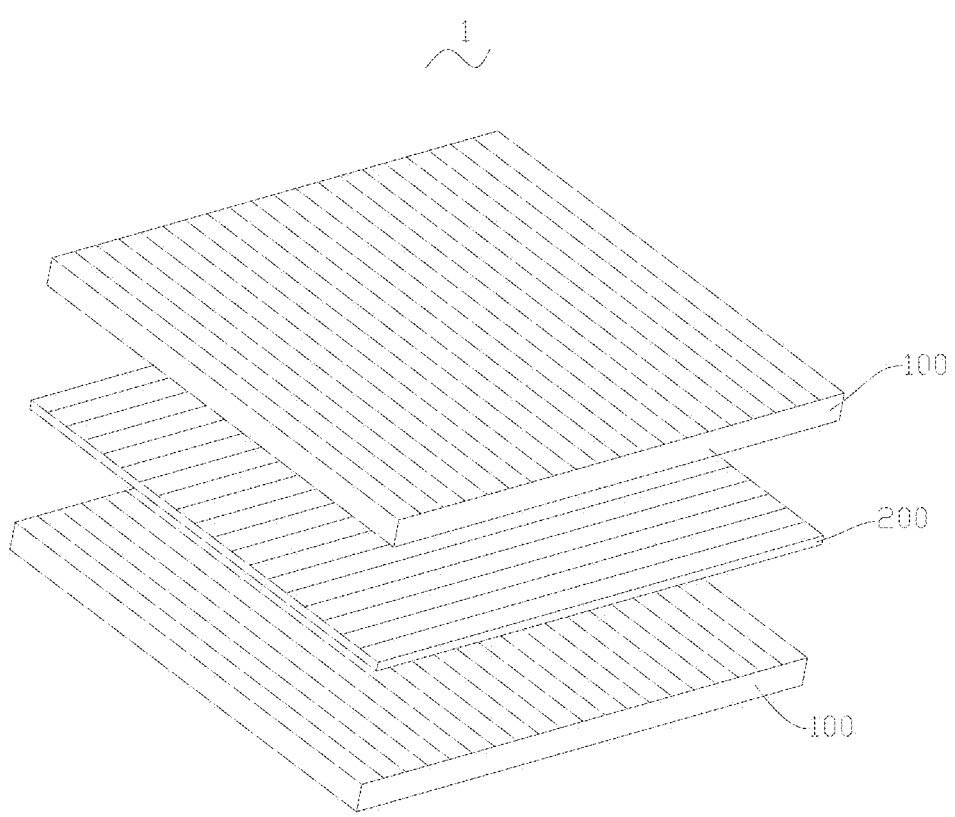

DIAPHRAGM DOME, METHOD FOR MANUFACTURING THE SAME AND SPEAKER

TECHNICAL FIELD

The present disclosure relates to the field of electro-acoustic conversion and, particularly, relates to a diaphragm dome, a method for manufacturing a diaphragm dome and a speaker.

BACKGROUND

With the development of electron industry, it is necessary for the electro-acoustic system to successively improve its performance and reliability, requirements on the diaphragm dome becomes higher and higher. The diaphragm dome in the prior art polymerized by aluminum foil and foam material cannot satisfy these requirements now, phenomenon such as aluminum foil breaking, aluminum foil and foam material layering, insufficient material strength and so on will occur. The aluminum foil is generally used as the appearance, which may easily be contaminated or scratched, the foam material is easy to deform when being pressed, therefore cannot suffer stress, and is permeable to water.

Therefore, there is a need to provide a new technical solution so as to solve the above technical problem.

BRIEF DESCRIPTION OF DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

FIG. 1 is a structural schematic view of a diaphragm dome in accordance with an exemplary embodiment of the present disclosure.

DESCRIPTION OF EMBODIMENTS

The present disclosure will be further illustrated with reference to the accompanying drawings and the embodiments.

The present disclosure discloses a speaker, which includes a vibrating system, the vibrating system includes a diaphragm dome, the diaphragm dome is attached on the center of the diaphragm, and generally has a shape corresponding to magnetic circuit.

Please refer to FIG. 1, which is a structural schematic diagram of a diaphragm dome in accordance with an exemplary embodiment of the present disclosure. The diaphragm dome 1 includes a first carbon fiber layer 100 and a second carbon fiber layer 200 which are alternatively arranged by stacking. The diaphragm dome 1 can be a double-layer or multi-layer composite structure by stacking. In an embodiment shown in FIG. 1, the diaphragm dome is a three-layer composite structure. The first carbon fiber layer 100 and the second carbon fiber layer 200 are respectively a single layer structure formed by one-way extended carbon fiber bundle, the extending direction of the carbon fiber bundle of the first carbon fiber layer 100 is perpendicular to the extending direction of the carbon fiber bundle of the second carbon fiber layer 200, and thickness difference exists between the first carbon fiber layer 100 and the second carbon fiber layer 200. The first carbon fiber layer 100 and the adjacent second carbon fiber layer 200 can be processed by hot pressing. The thickness of the first carbon fiber layer 100 and the thickness of the second carbon fiber layer 200 can be determined according to the required thickness and the strength of actual product. In the present embodiment, the number of the first carbon fiber layer 100 is two, the number of the second carbon fiber layer 200 is one, the second carbon fiber layer 200 is clamped between the two first carbon fiber layers 100. Optionally, the thickness range of the diaphragm dome 1 is 40~250 μm.

In order to make the diaphragm dome 1 have different strength in longitudinal direction and in transverse direction so as to be adaptive to different types of speakers, for a track-type speaker, a track-type diaphragm dome is provided correspondingly, the first carbon fiber layer 100 and the second carbon fiber layer 200 can respectively have different thicknesses, the carbon fiber bundle of the first carbon fiber layer 100 is arranged along a short axis direction of the dome, the carbon fiber bundle of the second carbon fiber layer 200 is arranged along a long axis direction of the dome. Optionally, the thickness ratio d of the first carbon fiber layer 100 and the second carbon fiber layer 200 is $1 < d \leq 20$. In the present embodiment, the thickness ratio d of the first carbon fiber layer 100 and the second carbon fiber layer 200 is 3. The thickness of the fiber layer extending corresponding to the long and short axis direction is related to vibration strength of the speaker in different frequency bands. The thickness of the second carbon fiber layer 200 in the short axis direction is larger, which is advantageous to frequency response of middle-high frequency.

In order to make the diaphragm dome obtain a better rigidity, the first carbon fiber layer 100 and the second carbon fiber layer 200 are respectively formed by one-way arranged carbon fiber bundle with tensile modulus not less than 300 Gpa, specifically, the carbon fiber of T series from T100 and all M series of Toray® can be adopted, or carbon fiber from other series or other suppliers having same strength level.

The type of the carbon fiber bundle of the first carbon fiber layer 100 and the carbon fiber bundle of the second carbon fiber layer 200 can be the same or different. Optionally, the carbon fiber layer 101 and the carbon fiber layer 201 are formed by adopting a same type of carbon fiber.

Further, the first carbon fiber layer 100 and the second carbon fiber layer 200 are both formed by one-way extended carbon fiber bundle after being presoaked by resin, particularly epoxy resin, polyether ether ketone, polyimide, poly-phenylene sulfide, poly-p-phenylene benzobisthiazole, aramid fiber 1414 and so on can be adopted for presoaking.

The present disclosure also provides a method for manufacturing the diaphragm dome, which includes the following steps:

Step S1, providing a first carbon fiber layer 100, the first carbon fiber layer 100 is formed by one-way extending and arranging of a carbon fiber bundle along a first direction after being presoaked by resin;

Step S2, providing a second carbon fiber layer 200, the second carbon fiber layer 200 is formed by one-way extending and arranging of a carbon fiber bundle along a second direction after being presoaked by resin, the second direction is perpendicular to the first direction;

Step S3, the first carbon fiber layer 100 and the second carbon fiber layer 200 are alternatively arranged by stacking and formed by hot pressing;

Step S4, cutting.

In the present step, the cutting manner includes laser cutting, trimming die punching cutting and die cutting by die-cutting machine.

The diaphragm dome provided by the present disclosure has the following beneficial effects:

First, the diaphragm dome is formed by alternatively stacking of carbon fiber layers formed by one-way extending and arranging of carbon fiber bundle, and the extending directions of the carbon fiber bundle of two adjacent carbon fiber layers are perpendicular to each other, which replaces the method in the prior art that diaphragm dome is formed by polymerizing of copper foil, aluminum foil and foaming material, the material has larger specific strength, in the situation that the same strength is provided, the material can reduce the thickness of the diaphragm dome; the two carbon fiber layers perpendicular to each other have different thicknesses, different vibration frequency can be obtained through adjusting the thickness difference. For example, for a speaker with a track-shape magnetic circuit, the thickness of the carbon fiber layer arranged parallel to the short axis direction of the track-shape dome is related to the vibration strength of middle-high frequency;

Second, the diaphragm dome is made of carbon fiber material, the material resists squeezing, and thus can be formed together with the voice diaphragm as a whole;

Third, the diaphragm dome is solid, which does not absorb water, thus has better water resistance;

Fourth, the carbon fiber layers of the diaphragm dome are well adhered, which is not readily layered;

Fifth, the diaphragm dome can adjust the thickness ratio of the carbon fiber layer in longitudinal direction and the carbon fiber layer in transverse direction according to product requirements, so as to provide more strength in the needed direction.

The above are only the embodiments of the present disclosure, it should be noted that, those skilled in the art can make improvements without departing from the inventive conception of the present disclosure, which all belonged to the protection scope of the present disclosure.

What is claimed is:

1. A diaphragm dome, comprising:
   a first carbon fiber layer; and
   a second carbon fiber layer;
   wherein the first carbon fiber layer and the second carbon fiber layer are alternatively arranged by stacking, the first carbon fiber layer and the second carbon fiber layer are both a single-layer structure formed by an one-way extended carbon fiber bundle, an extending direction of the carbon fiber bundle of the first carbon fiber layer is perpendicular to an extending direction of the carbon fiber bundle of the second carbon fiber layer, and a thickness difference exists between the first carbon fiber layer and the second carbon fiber layer.

2. The diaphragm dome as described in claim 1, wherein a thickness of the diaphragm dome is 40~250 μm.

3. The diaphragm dome as described in claim 1, wherein a thickness ratio of the first carbon fiber layer and the second carbon fiber layer is d, $1<d\leq20$.

4. The diaphragm dome as described in claim 3, wherein the thickness ratio of the first carbon fiber layer and the second carbon fiber layer is 3.

5. The diaphragm dome as described in claim 1, wherein the first carbon fiber layer and the second carbon fiber layer are both formed by an one-way arranged carbon fiber bundle with a tensile modulus not less than 200 Gpa.

6. The diaphragm dome as described in claim 1, wherein the dome is of a track shape, the carbon fiber bundle of the first carbon fiber layer is arranged along a short axis direction of the diaphragm dome, the carbon fiber bundle of the second carbon fiber layer is arranged along a long axis direction of the diaphragm dome.

7. The diaphragm dome as described in claim 1, wherein adjacent first carbon fiber layer and the second carbon fiber layer are processed by hot pressing.

8. A method for manufacturing the diaphragm dome as described in claim 1, comprising following steps:
   providing a first carbon fiber layer, the first carbon fiber layer is formed by one-way extending and arranging of a carbon fiber bundle along a first direction after being presoaked by resin;
   providing a second carbon fiber layer, the second carbon fiber layer is formed by one-way extending and arranging of a carbon fiber bundle along a second direction after being presoaked by resin, the second direction is perpendicular to the first direction;
   the first carbon fiber layer and the second carbon fiber layer are alternatively arranged by stacking and formed by hot pressing;
   cutting.

9. The method for manufacturing the diaphragm dome as described in claim 8, wherein a manner of cutting includes laser cutting, trimming die punching cutting and die cutting by a die-cutting machine.

10. A speaker, comprising a vibrating system, wherein the vibrating system comprises the diaphragm dome as described in claim 1.

* * * * *